(12) United States Patent
van den Akker

(10) Patent No.: US 6,415,250 B1
(45) Date of Patent: Jul. 2, 2002

(54) SYSTEM AND METHOD FOR IDENTIFYING LANGUAGE USING MORPHOLOGICALLY-BASED TECHNIQUES

(75) Inventor: David van den Akker, Antwerp (BE)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 08/878,264

(22) Filed: Jun. 18, 1997

(51) Int. Cl.$^7$ .............................................. G06F 17/27
(52) U.S. Cl. ...................................................... 704/9
(58) Field of Search ........................... 704/1, 2–7, 251, 704/277, 9, 10, 530, 531

(56) References Cited

U.S. PATENT DOCUMENTS

| | | | | |
|---|---|---|---|---|
| 4,829,580 A | * | 5/1989 | Church ........................ | 270/260 |
| 5,040,218 A | * | 8/1991 | Vitale et al. ................. | 704/260 |
| 5,182,708 A | * | 1/1993 | Ejiri .............................. | 704/9 |
| 5,251,129 A | * | 10/1993 | Jacobs et al. .................. | 704/9 |
| 5,392,419 A | * | 2/1995 | Walto .......................... | 395/500 |
| 5,418,951 A | * | 5/1995 | Damashek ..................... | 707/5 |
| 5,490,061 A | * | 2/1996 | Tolin et al. .................... | 704/2 |
| 5,548,507 A | * | 8/1996 | Martino ......................... | 704/9 |
| 5,745,602 A | * | 4/1998 | Chen et al. .................... | 704/9 |
| 5,752,051 A | * | 5/1998 | Cohen .......................... | 704/1 |
| 5,835,888 A | * | 11/1998 | Kanevsky et al. ............. | 704/9 |
| 5,913,185 A | * | 6/1999 | Martino et al. ................ | 704/9 |

* cited by examiner

Primary Examiner—Patrick N. Edouard
(74) Attorney, Agent, or Firm—Dinsmore & Shohl LLP

(57) ABSTRACT

A language identification system for automatically identifying a language in which an input text is written based upon a probabilistic analysis of predetermined portions of words sampled from the input text. The predetermined portions of words reflect morphological characteristics of natural languages. The automatic language identification system determines which language of a plurality of represented languages a given text is written based upon a value representing the relative likelihood that the text is a particular one of the plurality of represented languages due to a presence of a morphologically-significant word portion in the text. Preferably the word portion is the last three characters in a word. The relative likelihood is derived from a relative frequency of occurrence of the fixed-length word ending in each of a plurality of language corpuses, within each language corpus corresponding to one of the plurality of represented languages. Specifically, the automatic language identification system includes a language corpus analyzer that generates, for each of a plurality of word endings extracted from at least one of the language corpuses, a plurality of probabilities associated with the word ending and one of the plurality of represented languages. Each of the language corpuses represents a natural language and each of the probabilities represents a relative likelihood that the text is the associated language due to the presence of the associated word ending in the text. The relative likelihood is derived from a relative frequency that the associated word ending occurs in each of the plurality of language corpuses. The automatic language identification system also comprises a language identification engine that determines, for each of the represented languages, an arithmetic sum of the relative probabilities for all the word endings which appear in the text. The source language is determined to be the represented language having the greatest arithmetic sum of relative probabilities, provided this sum exceeds zero.

19 Claims, 12 Drawing Sheets

FIG. 2A

| INFLECTIONAL MORPHOLOGY | | | | | |
|---|---|---|---|---|---|
| MORPHOLOGY | ENGLISH | | GERMAN | | FRENCH | |
| SINGULAR-PLURAL | HOUSE | HOUSES | MANN | MÄNNER | CHEVAL | CHEVAUX |
| INFINITIVE-PAST TENSE | TO WALK | SHE WALKED | LAUFEN | ICH LIEF | MANGER | ILS MANGENT |
| DEGREES OF COMPARISON | NICE | NICER NICEST | SCHÖN | SCHÖNER SCHÖNSTE | BON-MEILLEUR | LE-MEILLEUR |

FIG. 2B

| TYPES OF DERIVATIONAL MORPHOLOGY | | |
|---|---|---|
| MORPHOLOGICAL TYPE | CHANGES | EXAMPLE |
| CONVERSION | NO FORMAL CHANGES | TO RELEASE-A RELEASE |
| PREFIXATION | A PREFIX IS ADDED TO A WORD | AMERICAN-ANTI-AMERICAN |
| SUFFIXATION | A SUFFIX IS ADDED TO A WORD | TO DEVELOP-THE DEVELOPMENT |
| PARASYNTHETIC DERIVATION | A SUFFIX AND A PREFIX ARE ADDED TO A WORD | A SPECTACLE-BESPECTACLED |

FIG. 2C

| SUFFIXATION | | | |
|---|---|---|---|
| MORPHOLOGY | ENGLISH | GERMAN | FRENCH |
| FROM VERB TO ADJECTIVE | TO DESIRE DESIRABLE | BESPRECHEN BESPRECHBAR | TARDER TARDIF |
| FROM VERB TO NOUN | TO HUNT HUNTER | KOMPONIEREN KOMPONIST | SOUFFRIR SOUFFRANCE |
| FROM MALE NOUN TO FEMALE NOUN | COUNT COUNTESS | KÖNIG KÖNIGIN | DIRECTEUR DIRECTRICE |
| FROM ADJECTIVE TO VERB | CALM CALMLY | SCHNELL SCHNELLSTENS | NATUREL NATURELLEMENT |

FIG. 5A

| SUFFIX PROBABILITY TABLE | | | | |
|---|---|---|---|---|
| CORPUS SIZE | 148297 | 164691 | 168946 | 189610 |
| SUFFIX | ENGLISH | FRENCH | DUTCH | GERMAN |
| A | 03031 | 01480 | 00180 | 00025 |
| AND | 04244 | 00271 | 00794 | 00721 |
| DE | 00016 | 07776 | 10459 | 00022 |
| DES | 00086 | 02742 | 00021 | 01260 |
| EN | 00000 | 02231 | 04539 | 00000 |
| ENT | 01777 | 05052 | 00454 | 00401 |
| EST | 00483 | 03065 | 00317 | 00101 |
| ET | 00002 | 02455 | 00003 | 00000 |
| FOR | 01776 | 00002 | 00010 | 00005 |
| IN | 02701 | 03052 | 03915 | 00000 |
| ING | 04242 | 00019 | 04061 | 02763 |
| ION | 02250 | 00124 | 00061 | 00266 |
| LA | 00005 | 02639 | 00020 | 00597 |
| LE | 00000 | 04317 | 00009 | 00011 |
| LES | 00300 | 03935 | 00110 | 00002 |
| OUR | 02257 | 05221 | 00010 | 00309 |
| QUE | 00063 | 01453 | 00007 | 00004 |
| THE | 08950 | 03333 | 00116 | 00004 |
| TO | 04656 | 00003 | 00012 | 00009 |
| WE | 01528 | 00031 | 00438 | 00000 |
| YOU | 02468 | 00000 | 00016 | 00000 |
| À | 00000 | 03256 | 00002 | 00009 |

| SUFFIX PROBABILITY TABLE | | | | |
|---|---|---|---|---|
| NORMALIZED CORPUS SIZE | 100,000 | 100,000 | 100,000 | 100,000 |
| SUFFIX | ENGLISH | FRENCH | DUTCH | GERMAN |
| A | 02044 | 00899 | 00107 | 00014 |
| AND | 02862 | 00165 | 00470 | 00380 |
| DE | 00011 | 04722 | 06191 | 00012 |
| DES | 00058 | 01665 | 00012 | 00665 |
| EN | 00000 | 01355 | 02687 | 00000 |
| ENT | 01198 | 03068 | 00269 | 00211 |
| EST | 00326 | 01861 | 00188 | 00053 |
| ET | 00001 | 01491 | 00002 | 00000 |
| FOR | 01198 | 00001 | 00006 | 00003 |
| IN | 01821 | 01853 | 02317 | 00000 |
| ING | 02860 | 00012 | 02404 | 01457 |
| ION | 01517 | 00075 | 00036 | 00140 |
| LA | 00003 | 01602 | 00012 | 00315 |
| LE | 00000 | 02621 | 00005 | 00006 |
| LES | 00202 | 02389 | 00065 | 00001 |
| OUR | 01522 | 03170 | 00006 | 00163 |
| QUE | 00042 | 00882 | 00004 | 00002 |
| THE | 06035 | 02024 | 00069 | 00002 |
| TO | 03140 | 00002 | 00007 | 00005 |
| WE | 01030 | 00019 | 00259 | 00000 |
| YOU | 01664 | 00000 | 00009 | 00000 |
| À | 00000 | 01977 | 00001 | 00005 |

| SUFFIX PROBABILITY TABLE |||||
|---|---|---|---|---|
| SUFFIX 602 | LANGUAGES 604 ||||
| | ENGLISH | FRENCH | DUTCH | GERMAN |
| A | .20 | .08 | .01 | 0 |
| AND | .58 | .03 | .09 | .07 |
| DE | 0 | .17 | .23 | 0 |
| EN | -.99 | .11 | .21 | -.99 |
| ENT | .23 | .59 | .05 | .04 |
| EST | .11 | .66 | .01 | .06 |
| ET | 0 | .51 | 0 | -.99 |

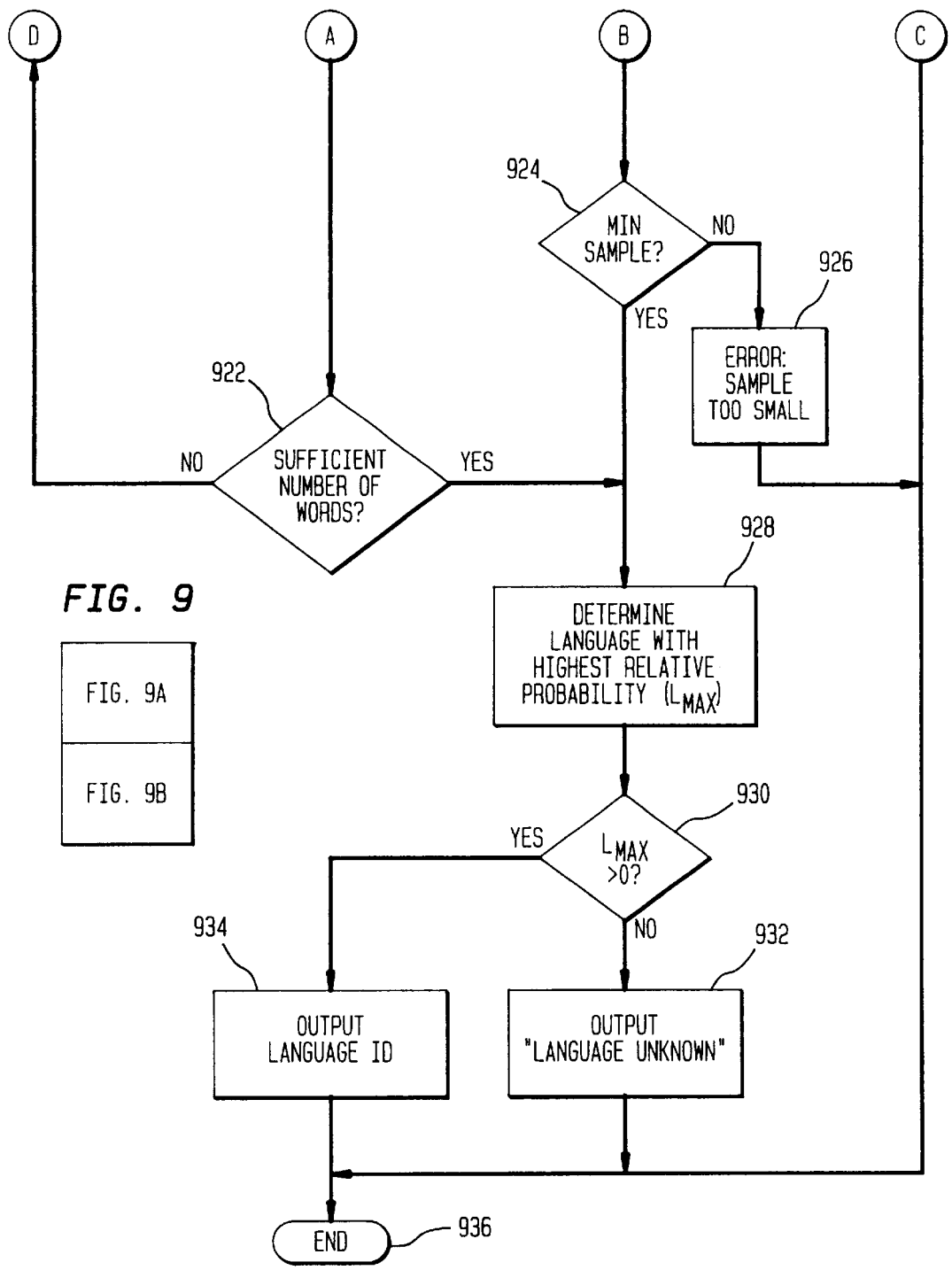

SYSTEM AND METHOD FOR IDENTIFYING LANGUAGE USING MORPHOLOGICALLY-BASED TECHNIQUES

BACKGROUND OF THE INVENTION

1. Field of the Invention

The present invention is directed to human language recognition technology and, more particularly, to a system and method that automatically identifies the language in which a text is written.

2. Related Art

Knowledge of the language of a document, referred to as the source language, can enable text-oriented applications such as word processors, presentation managers, search engines and other applications which process, store or manipulate text, to automatically select appropriate linguistic tools (hyphenation, spell checking, grammar and style checking, thesaurus, etc.). Knowledge of the source language also provides the ability to decide whether a text may need translation prior to display and enables documents to be classified and stored automatically and efficiently according to their source language. With respect to electronic communications, language identification enables communications applications to catagorize, filter and prioritize messages, query hits and electronically-mailed messages and documents according to a preferred source language.

Generally, text-oriented applications are incapable of identifying the source language in which a given text is written. Instead, these applications typically assume that the text is written in a default source language, usually English, unless the language has been explicitly specified. In the event that the text was not written in the default language, any type of linguistic analysis or classification will fail or lead to indeterminant results.

There are several conventional methods that have been used to identify the source language in which an unknown text is written. One such conventional language identification method which is based on what is commonly referred to as trigram analysis is disclosed in U.S. Pat. No. 5,062,143 to Schmitt. A trigram is a sequence of three characters occurring anywhere in a body of text, and may contain blanks (spaces). Schmitt appears to disclose a system that determines a "key set" of trigrams for each language by parsing a sample of text (approximately 5,000 characters) written in each language. The "key set" for a language includes trigrams for which the frequency of occurrence within the unknown text accounts for approximately one third of the total number of trigrams present in the text.

To determine the language of an unknown text, Schmitt parses the text into successive trigrams and then iteratively compares each parsed trigram to the "key set" associated with each language. The number of times each parsed trigram matches a trigram in a key set is counted. Schmitt then calculates a ratio ("hit percent") of the number of matches to the number of trigrams in the unknown text, and compares this hit percent to a predetermined threshold. If the hit percent for the particular language key set is greater than the predetermined threshold, Schmitt records the hit percent. After all language key sets have been processed, the language corresponding to the key set yielding the highest recorded hit percent is identified to be the language of the text. If there is no hit percent that exceeds the predetermined threshold, then no language identification is made.

There are several disadvantages to such trigram-based language identification methods. First, a significant number of samples of the unknown text need to be obtained. Take, for example, an unknown text containing the word "monitor" (the average word length in the English language is approximately seven characters) which is separated from other words by spaces (denoted "_"). A trigram-based sampling of this word alone requires seven samples: _mo, mon, oni, nit, ito, tor, or_. The iterative comparison of each sampled trigram to the key set of each language is computationally expensive in both time and resources. In addition, because the identification of the unknown text requires a hit percent which exceeds a predetermined threshold, this approach is inherently based upon an assumption that a sufficient amount of sampled data from the unknown text is available to generate enough hits to exceed the threshold. As a result, this method is often found to be ineffective when used on small samples of unknown text, such as a title or header, that contains so few trigrams as to be incapable of exceeding this predetermined threshold.

Another conventional method used to identify the source language in which an unknown text is written is described in U. S. Pat. No. 5,548,507 to Martino et al. Martino appears to teach a language identification process using coded language words. Martino generates Word Frequency Tables (WFTs) each of which is associated with a language of interest. The WFT for a particular language contains relatively few words that are statistically determined to be the most frequent in the given language, based on a very large number of sample documents in that language. The sample documents for the represented language form a training corpus. The WFT also contains a Normalized Frequency Occurrence (NFO) value representing the frequency of occurrence of each word in the language. Associated with each WFT is an accumulator that stores and accumulates NFO values.

To determine the identity of an unknown text, a word from the text is compared to all the words in all of the WFTs. Whenever a word is found in any WFT, that word's associated NFO value is added to a current total in the associated accumulator. In this manner, the totals in the associated accumulators increase as additional words are successively sampled from the unknown text. Processing stops either at the end of the unknown text file, or after a predetermined number of sampled words have been processed. The language corresponding to the accumulator with the highest total NFO value is identified as the language of the text.

The method described in Martino appears to provide advantages over Schmitt's trigram-based language identification. However, according to Martino, the method requires approximately 100 words to be read from the unknown text to identify the language in which it is written, and several hundred words are preferred. In addition to the large number of samples which must be taken, the success of the Martino device is dependent upon the type of unknown text. Because the most frequently occurring words in most languages are predominantly function words such as pronouns, articles and prepositions, this method has limited success when the unknown text does not contain such words. For example, the Martino device appears to have limited success when applied to highly technical documents and small texts such as a title, header or query. Furthermore, significant time and expense is required to generate the word frequency tables.

What is needed, therefore, is a system that efficiently and accurately identifies the language in which a text is written when provided with a relatively few number samples of the text. System performance should not be adversely affected by a limited training corpus and should not depend on the content or length of the unknown text.

SUMMARY OF THE INVENTION

The above and other drawbacks of conventional language identification systems are overcome by the language identification system of the present invention. One aspect of the invention is a language identification system for automatically identifying a language in which an unknown input text is written based upon a probabilistic analysis of predetermined portions of words sampled from the input text which reflect morphological characteristics of natural languages.

In another aspect of the invention an automatic language identification system is disclosed. The automatic language identification system determines in which language of a plurality of represented languages a given text is written. This determination is based upon a value representing the relative likelihood that the text is a particular one of the represented languages due to the presence in the text of a predetermined character string that contains morphological features of the represented languages. The relative likelihood is derived from a relative frequency of occurrence of the character strings in each of a plurality of language corpuses, within each language corpus corresponding to one of the plurality of represented languages. In one embodiment, the predetermined character string is a three-character word ending.

In another aspect of the invention an automatic language identification system for determining the source language of a text is disclosed. The automatic language identification system comprises a language corpus analyzer that generates, for each of a plurality of fixed-length suffixes extracted from at least one of a plurality of language corpuses, a plurality of probabilities associated with the suffix and one of the plurality of represented languages. Each of the language corpuses represents a natural language and each of the probabilities represents a relative likelihood that the text is the associated language due to the presence of the associated suffix in the text. The relative likelihood is derived from a relative frequency that the associated suffix occurs in each of the plurality of language corpuses. The automatic language identification system also comprises a language identification engine. The language identification engine determines, for each of the represented languages, an arithmetic sum of the relative probabilities for all the suffixes which appear in the text. The source language is determined to be the represented language having a greatest arithmetic sum of relative probabilities.

In one embodiment of this aspect of the invention the language corpus analyzer includes a means for generating, for each of the plurality of language corpuses, a frequency list that includes a normalized frequency value indicating a number of times the extracted suffix appears in a corresponding language corpus. The language corpus analyzer also includes a means for generating a probability table that contains the above plurality of probabilities based upon the normalized frequency values in the frequency lists.

In another embodiment of this aspect of the invention, the language corpus analyzer also includes a parser for parsing the language corpuses to generate parsed words, and a suffix extractor for extracting the suffixes from each of the parsed words. In another embodiment of this aspect of the invention the language corpus analyzer also includes a format filter for formatting the language corpuses for the language corpus analyzer.

In still another embodiment of this aspect of the invention the language identification engine includes a language determinator that accumulates the relative likelihood values which are associated with one of the languages and which are associated with the suffixes which appear in the given input text. In another embodiment of this aspect of the invention the probabilities are set to a predetermined negative value when the associated suffix does not appear in the language corpus corresponding to the associated language. In this embodiment, the arithmetic sum of relative probabilities is to exceed zero for a represented language to be considered to be the source language of the text. Specifically, the suffix is preferably a predetermined number of characters at the end of a word. The word ending is the right-most predetermined number of characters in a left-to-right alphabetic language and the left-most predetermined number of characters in a right-to-left alphabetic language.

Preferably, each of the plurality of language corpuses is derived from a plurality of documents in each of a variety of sources. Also, the language identification engine is preferably implemented in software and the probability table is a finite state machine embodied in software and compiled with the language identification engine.

In another aspect of the invention an automatic language identification system for determining a source language of a text is disclosed. The automatic language identification system includes a first means for generating, for each of a plurality of three character word endings extracted from at least one of a plurality of language corpuses, a plurality of probabilities associated with the word ending and one of the represented languages. Each of the language corpuses represents a natural language and each of the probabilities represents a relative likelihood that the text is the associated language due to the presence of the associated word ending in the text. The relative likelihood is derived from a relative frequency with which the associated word ending occurs in each of the language corpuses. The automatic language identification system also includes a second means for determining, for each of the represented languages, an arithmetic sum of the relative probabilities for all of the word endings which appear in the text. The source language is determined to be the represented language having the greatest arithmetic sum of relative probabilities.

In one embodiment of this aspect of the invention, the first means includes a third means for generating, for each of the language corpuses, a normalized frequency list. The frequency list includes a normalized frequency value indicating a number of times the extracted word ending appears in a corresponding language corpus. The first means also includes a fourth means for generating a probability table containing said plurality of probabilities using the normalized frequency values in the normalized frequency lists.

In another embodiment of this aspect of the invention, the language identification engine includes a language determinator means for accumulating the relative likelihood values associated with one of the languages which is associated with the word endings which appear in the text.

In another embodiment of this aspect of the invention, the probabilities are set to a predetermined negative value when the associated word ending does not appear in the language corpus corresponding to the associated language.

In another aspect of the present invention, a method for identifying the language of a text is disclosed. The language is determined to be one of a plurality of languages, each of which is represented by a language corpus. The method comprises the steps of: a) parsing a word from a language corpus; b) extracting all suffixes from the parsed words, the suffixes defined as being the last three characters of a word; c) updating a suffix frequency list corresponding to the language corpus with the extracted suffix and a normalized frequency of occurrence of the extracted suffix in the corresponding language corpus; d) repeating steps a) through c) for each of the plurality of language corpuses to result in a plurality of frequency lists, each associated with one language corpus; and e) creating a probability table containing probabilities derived from the normalized frequency of occurrences and representing a relative likelihood that the language of the text is one of the represented languages due to the presence of the suffix.

In one embodiment of this aspect of the invention, the method also includes the step of: f) substituting a negative value in the table for all probabilities having a value of zero. In another embodiment, the method includes the additional steps of: g) parsing the text to generate a sample word; h) extracting a suffix from the sample word; l) retrieving the associated probabilities for each of the extracted sample suffix in the probability table; j) summing, for each of the represented languages, the associated probabilities retrieved from the probability table, resulting in an accumulated relative likelihood value that language of the text is the corresponding language due to the appearance of the sampled suffix in the text; k) repeating steps g) though j) for a predetermined number of sampled words; and l) selecting one of the represented languages as the language of the text, provided the selected language has a highest accumulated probability value greater than zero.

Embodiments of the present invention can be used for all text-oriented software, ranging from the traditional office applications (word processors, presentation managers, spelling checkers, etc.) and document management systems, to emerging markets for Intranet/internet applications (browsers, search engines) and information retrieval systems. In particular the present invention can be used to enable any text-oriented application to more accurately and efficiently identify the source language of a given text without any user intervention. Furthermore, applications handling incoming documents of unknown and unpredictable origin can dynamically classify these documents according to their source language. Similarly, information retrieval systems for Intranet/internet search engines can provide enhanced functionality by filtering documents that are not in a user's native language according to the user's language profile.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

This invention is pointed out with particularity in the appended claims. The above and further advantages of this invention may be better understood by referring to the following description when taken in conjunction with the accompanying drawings, in which:

FIG. 2A is a table illustrating inflectional morphology in the English, German and French languages;

FIG. 2B is a table illustrating the types of derivational morphology;

FIG. 2C is a table illustrating suffixation in the English, German and French languages;

FIG. 5A is an exemplary suffix probability table containing combined frequency lists for the English, French, Dutch and German languages;

FIG. 5B is an exemplary suffix probability table containing normalized frequency values for suffixes extracted from four language corpuses;

FIG. 6 is a diagram of a portion of an exemplary suffix probability table created in accordance with the present invention;

FIG. 9 illustrates the relative arrangement of FIGS. 9A and 9B;

FIGS. 9A and 9B are a flowchart of the functions performed by the present invention to perform the morphological probabilistic language identification technique in accordance with one embodiment of the present invention.

DETAILED DESCRIPTION

Figure 1:
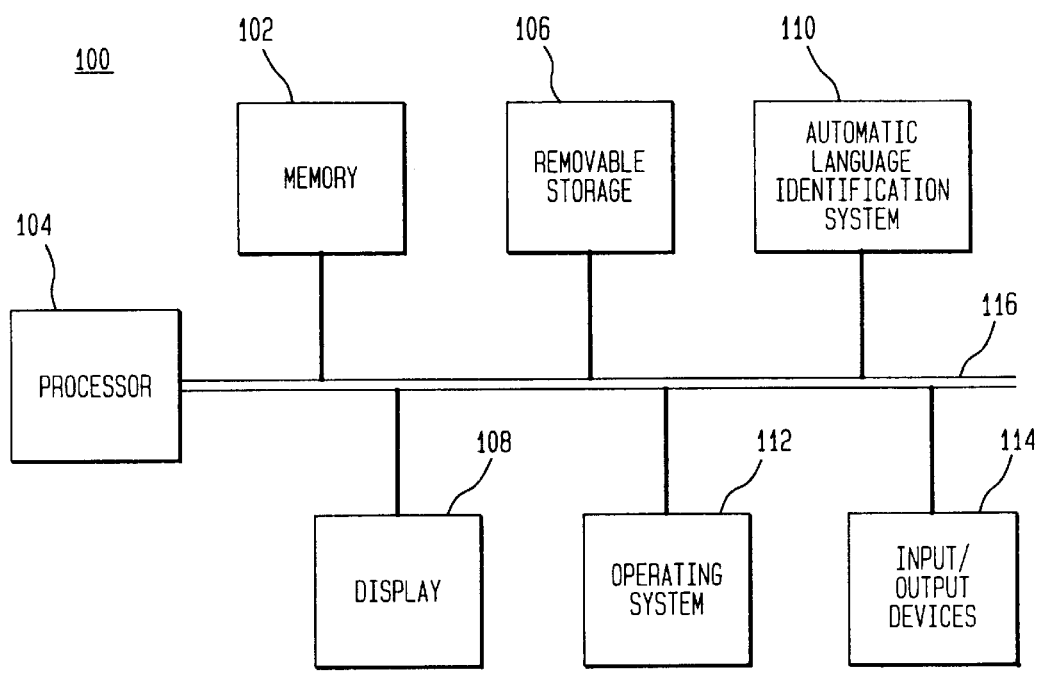
FIG. 1 is a functional block diagram of a computer system on which the morphologically-based probabilistic language identification system of the present invention can be implemented.

An exemplary computer system environment in which the automatic language identification system of the present invention may be implemented is illustrated in FIG. 1. Computer system 100 may be a general purpose computer system and may operate as a client and/or server node on a network or as a stand-alone computer system, such as a personal computer. The general purpose computer system 100 typically includes a processor 104 connected to a memory system 102 via an interconnection means such as bus 116. Input/output devices 114 such as disk controllers, graphics cards, or the like, may be included in the computer system 100. The input/output devices 114 may include a keyboard and/or a pointing device which may, for example, be a joystick, trackball or mouse that allows a user to interact with the system 100. The display 108 may be a CRT screen, or similar device, that allows the user to visualize various operations and user interactions with the computer system 100. The removable storage device 106 may be, for example, a CD-ROM drive, a tape drive or a diskette drive. The removable storage device 106 can be used to load application software including the automatic language identification software of the present invention. The computer system 100 hosts an operating system 112 and is programmable using a high level computer programming language.

The processor 104 is a commercially available processor such as the Pentium microprocessor from Intel Corporation, PowerPC microprocessor, SPARC processor, PA-RISC processor or 68000 series microprocessor. Many other processors are also available. Such a processor usually executes the operating system 112 which may be, for example, the DOS, Windows 95, or Windows NT operating systems from the Microsoft Corporation, the System 7 operating system from Apple Computer, the Solaris operating system from Sun Microsystems, the Unix operating system available from many vendors such as Sun Microsystems, Inc., Hewleft-Packard and AT&T, or the NetWare operating system available from Novell, Inc. The operating system 112 interfaces with firmware and hardware in a well-known manner. Memory system 102 may be any commonly available random access memory (RAM) or read-only memory (ROM), such as a resident hard drive.

The operating system 112 controls the execution of other computer programs and provides such functions as scheduling, debugging, input-output control, accounting compilation, storage assignment, data management, memory management, communication control and related services. The processor 104 and operating system 112 define a computer platform for which application programs in high level programming languages are written. The computer system 100 is preferably networked to other computer systems via a local or wide area network, using, for example, a network interface card (NIC) or other communication device installed to communicate over a network. Other network management software may also be included as is well known in the art.

The automatic language identification system 110 of the present invention is preferably implemented in the C++ or Java programming languages, although the system 110 may be written in any other programming language, including, for example, the C programming language. The automatic language identification system 110 is capable of operating on any well-known computing platform 100. The software techniques for performing language identification functions in accordance with the present invention typically reside in memory 102 and may be stored on a computer-readable medium such as, for example, magnetic disk, compact disk or magnetic tape. The software embodiment of the present invention may be loaded into the computer system 100 using an appropriate peripheral device, as known in the art. It should be understood, however, that the present invention is not limited to a particular computer platform, particular operating system or particular processor. The exemplary environments identified above are given by way of example only; the invention may be implemented in a variety of computer systems having a variety of system architectures. In addition, it should be noted that the present invention may be implemented in firmware, hardware or in a combination of these implementations.

In brief overview, the automatic language identification system 110 of the present invention automatically identifies a language in which an input text is written based on a morphologically-based probability analysis of sampled words contained in the unknown text. The unknown text can be input from an application program running on the computer system 100, such as a word processor, network communication application or file manager. Alternatively, the text may come from the input/output device 114, or from an application program running on another computer system. For example, the text may be received from an Internet web site through a search engine on computer system 100 or from another node on an Intranet received through a network communications application. In accordance with the present invention, the automatic language identification system 110 extracts words from the input text and probabilistically determines which of a plurality of languages is best characterized by the extracted word portions which reflect morphological features of natural languages.

The study of the internal structure of words and the rules by which words are formed is called morphology, derived from the Greek word "morphé", meaning form. The traditional term for the most elemental unit of the grammatical form is a morpheme. Some morphemes are bound, meaning that they must be joined to other morphemes as part of words, and never appear as words by themselves. Other morphemes are free, meaning they need not be attached to other morphemes. Affixes (prefixes, suffixes, infixes) are examples of bound morphemes. Furthermore, a single word can be composed of one or more morphemes (for example, boy, boyish, boyishness).

In every language there are morphological rules that relate to the formation of words and which determine how morphemes combine to form new words. Inflectional morphology describes the process of adding morphemes to, and/or changing the base form (the root) of a word, resulting in a new form of that word. Inflectional morphemes never change the part of speech (syntactic category) of the words or morphemes to which they are attached. Instead, inflectional morphemes are used to create forms of a word that are ready for use in a specific syntactic environment. In other words, inflectional morphemes result in instances of the same word, rather than new words. The table illustrated in FIG. 2A illustrates some examples of inflectional morphology in several different languages.

Derivational morphology describes a process of adding morphemes to and/or changing a word resulting in a new word. Derivational morphemes can change the part of speech (syntactic category) of the words or types of morphemes to which they are attached, and new words can be subjected to inflectional morphology. The Table shown in FIG. 2B illustrates some examples of different types of derivational morphology. As shown, there are different morphological types, including conversion, prefixation, suffixation and parasynthetic derivation.

Significantly, the present invention identifies language based upon the morphological characteristics of natural languages. Natural languages, defined herein as languages used for human communication such as English, Dutch, French and German, are most efficiently characterized by their morphological characteristics; that is, by the way word forms are produced from word roots.

For most natural languages the morphological production of a word, whether inflectional, derivational, or both, typically takes place at the end, or suffix, of the word. For left-to-right alphabetic languages such as English and Greek, the end of the word is the right-most part of the word.

For those languages which are right-to-left alphabetic languages, such as Arabic and Hebrew, the end of the word is the left-most part of the word.

For example, in the word "smashing", the root is "smash" and the suffix is "ing", while in the word "development", the root is "develop" and the suffix is "ment". The table in FIG. 2C illustrates some examples of suffixation in several different languages.

Embodiments of the present invention identify the language in which a text is written based upon a morphological analysis of words that are contained within the text. The present invention identifies the language in which a text is written based upon predetermined word portions containing morphological features of the languages. Preferably, the predetermined word portion is a number of characters at the end of a word which contains the suffix of the word. It should be understood, however, that word portions containing other types of morphemes or portions of morphemes, could also be used without deviating from the scope of the present invention. For example, word portions that contain the prefix may be used.

Figure 3:
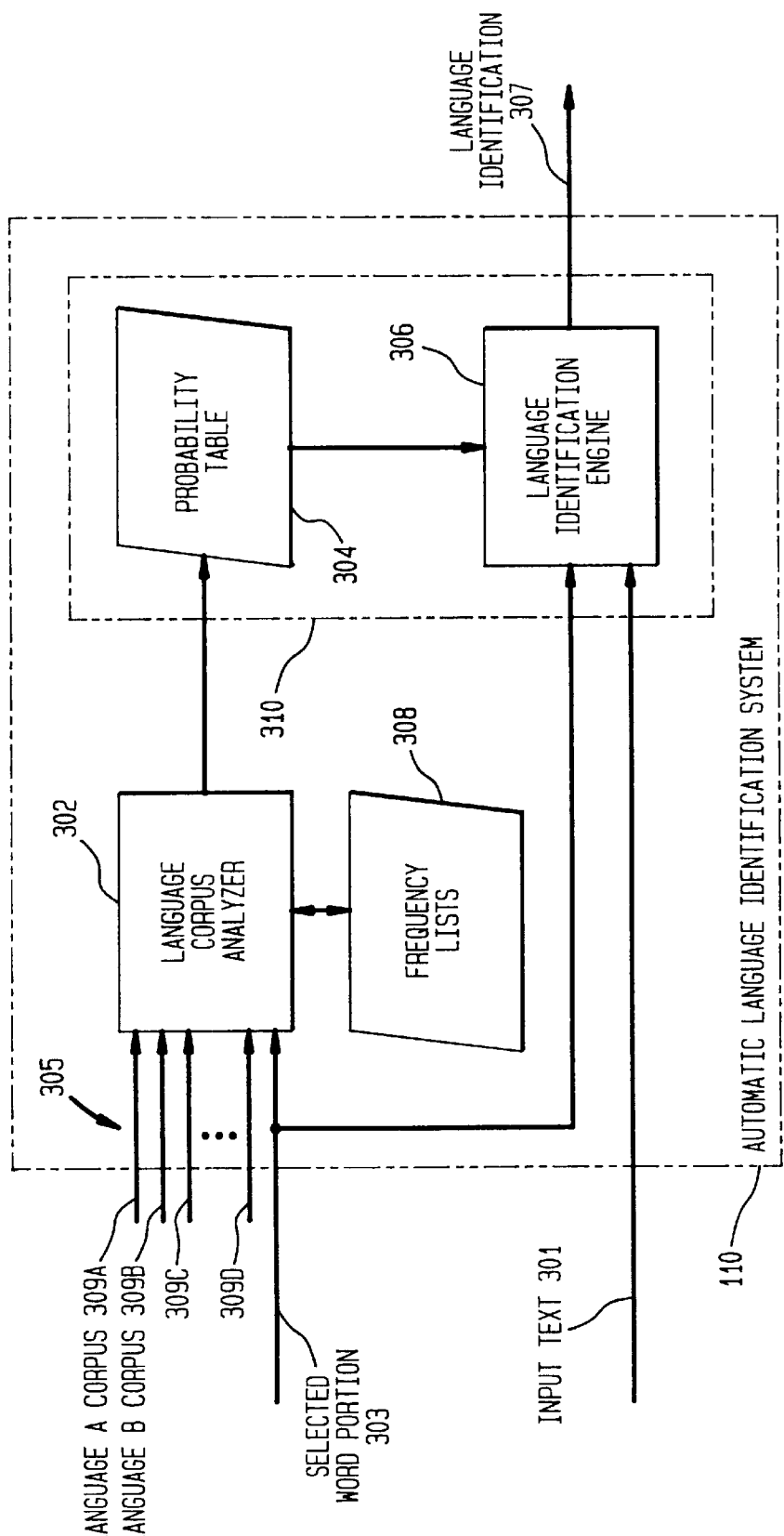
FIG. 3 is a functional block diagram of a preferred embodiment of the automatic language identification system of the present invention.

FIG. 3 is a functional block diagram of one embodiment of the automatic language identification system 110 of the present invention. The system 110 includes a language corpus analyzer 302 that generates a probability table 304 based on a training corpus 305 which includes one or more language corpuses 309A–309D. A language identification engine 306 determines the language identity 307 of an input text 301 using the probability table 304 in accordance with the present invention.

In the illustrative embodiment, the training corpus 305 includes language A corpus 309A, language B corpus 309B, language C corpus 309C and language D corpus 309D (generally and collectively referred to as language corpuses 309). The language corpus analyzer 302 performs a morphological-based analysis of the training corpus 305. This analysis is preferably performed on a word portion which is a predetermined number of characters at the end of the words in the training corpus 305. This portion of the word is referred to generally herein as a suffix, although more or less characters may be included in the predetermined number of characters at the end of the word. The word ending is the right-most predetermined number of characters when the language corpuses to be tested are left-to-right alphabetic languages. On the other hand, the word ending is the left-most predetermined number of characters when the language corpuses to be tested are right-to-left alphabetic languages. As shown in FIG. 3, the word ending is preferably a selectable word portion 303 and is, therefore shown as an input to the language corpus analyzer 302. Generally, the language corpus analyzer 302 extracts the selected word portion 303 from each word in the language corpuses 309 and creates frequency lists 308, each corresponding to a language corpus 309. The frequency list 308 includes every selected word portion that was extracted from the corresponding language corpus 309 along with a frequency value indicative of the number of times the selected word portion was found within the corresponding language corpus 309. These frequencies are subsequently normalized to a common corpus size, serving as relative frequencies of each of the selected word portions in each language.

Each language corpus 309 includes a sufficient amount of written text to characterize a particular language according to the selected morphological characteristic. This amount of written text depends upon a number of factors. These factors include, for example, the number of individual sources from which the language corpus 309 is formed. For example, results may differ if a language corpus 309 is formed from one large document or a number of smaller documents. Another factor is the variety of the types of sources from which the language corpus is formed and the similarity of those sources with the type of input text 301. Types of sources include, for example, business documents, technical journals, popular magazines, newspapers and literature.

Other factors apparent to one skilled in the relevant art may also be considered. It should be understood, for example, that a single large technical document may not exhibit a sufficient variety of morphologically-derived or inflected words to effectively characterize a particular language. On the other hand, a language corpus that includes a variety of smaller documents will likely characterize a particular language more accurately. Furthermore, literal transcriptions of oral text should be avoided. Literal transcriptions of oral text are not generally indicative of written languages since they often contain slang or other colloquialisms, as well other non-word utterances like "umm", etc.

In a preferred embodiment, the language corpus 309 includes a number of texts drawn from a wide variety of sources. Moreover, in one preferred embodiment each language corpus 309 includes greater than three different written text samples for each type of source. In another embodiment each language corpus 309 includes three to ten different written text samples for each type of source. The size of the language corpus 309 is preferably greater than 1.5 Mbytes given the above-noted preferred contents of the corpus 309. It should be noted, however, that this size is based upon empirically-determined results and other sizes will yield satisfactory results depending upon the above-noted factors.

As noted, the language corpus analyzer 302 analyzes the language corpuses 309 and generates the probability table 304. The probability table 304 is an important aspect of the present invention and its creation, use and significance are described in detail below. Briefly, the probability table 304 includes an entry for every selected word portion 303 that occurs in at least one of the language corpuses 309. Associated with each extracted word portion is a relative probability that the input text 301 is a particular one of the languages represented by a language corpus 309 due to the presence of the extracted word portion in the input text 301. Since not all natural languages are likely to be represented in the table 304, these values represent the likelihood that the input text is a particular language relative to the other represented languages. Hence, these values are referenced to herein as "relative probabilities" or values representing a "relative likelihood". This relative likelihood is derived from the relative frequency that the word portion occurs in the language corpuses 309, as explained in detail below.

During operation, the language identification engine 306 receives the input text 301 from an external source and, using the probability table 304, generates a language identity output 307 indicating the language of the previously unknown text 301. More particularly, the identification engine 306 searches the probability table 304 for each of the morphologically-significant word portions extracted from the input text 301, summing the relative probability values associated with each language for each of the extracted word portions. The largest total accumulated relative likelihood value, provided it exceeds zero, identifies the language of the input text 301, the ID of which is output as language identity 307.

In a preferred embodiment, the probability table 304 includes values which violate the axiom that probabilities are non-negative numbers between 0.0 and 1.0. For those word portions which do not appear in a language corpus 309, the assigned relative probability value is zero since it is based upon the number of occurrences. For those word portions which rarely appear in a language corpus 309, the assigned relative probability is close to zero. Although these values are numerically close and therefore have a similar effect on the resulting sum of the relative probabilities, the implications of these values are significantly different. A probability of zero indicates that the word portion will likely never occur in the corresponding language while a small probability value indicates that the word portion rarely appears but does indeed exist. In other words, a probability of zero indicates that the input text 301 is very likely not in the associated language while a small probability value indicates that the input text 301 may be the language. To more accurately reflect this difference in significance despite numeric proximity, the zero probability values are replaced with a strong negative value. The resulting probability sum for a language will be impacted accordingly, and will be quickly identified as a language which cannot be the language in which the input text 301 is written.

In one embodiment of the present invention, the probability table 304 is stored within memory locations, of any type of memory (20, 30), that are accessible by the language corpus analyzer 302 and language identification engine 306. Preferably, however, the probability table 304 is written as a finite state machine embodied in software that is compiled with the source code for the language identification engine 306 as depicted by dashed box 310. As is clear from the description herein, the creation of the language corpuses 309 and the generation of the probability table 304 are performed prior to the operation of the language identification engine 306.

Figure 4:
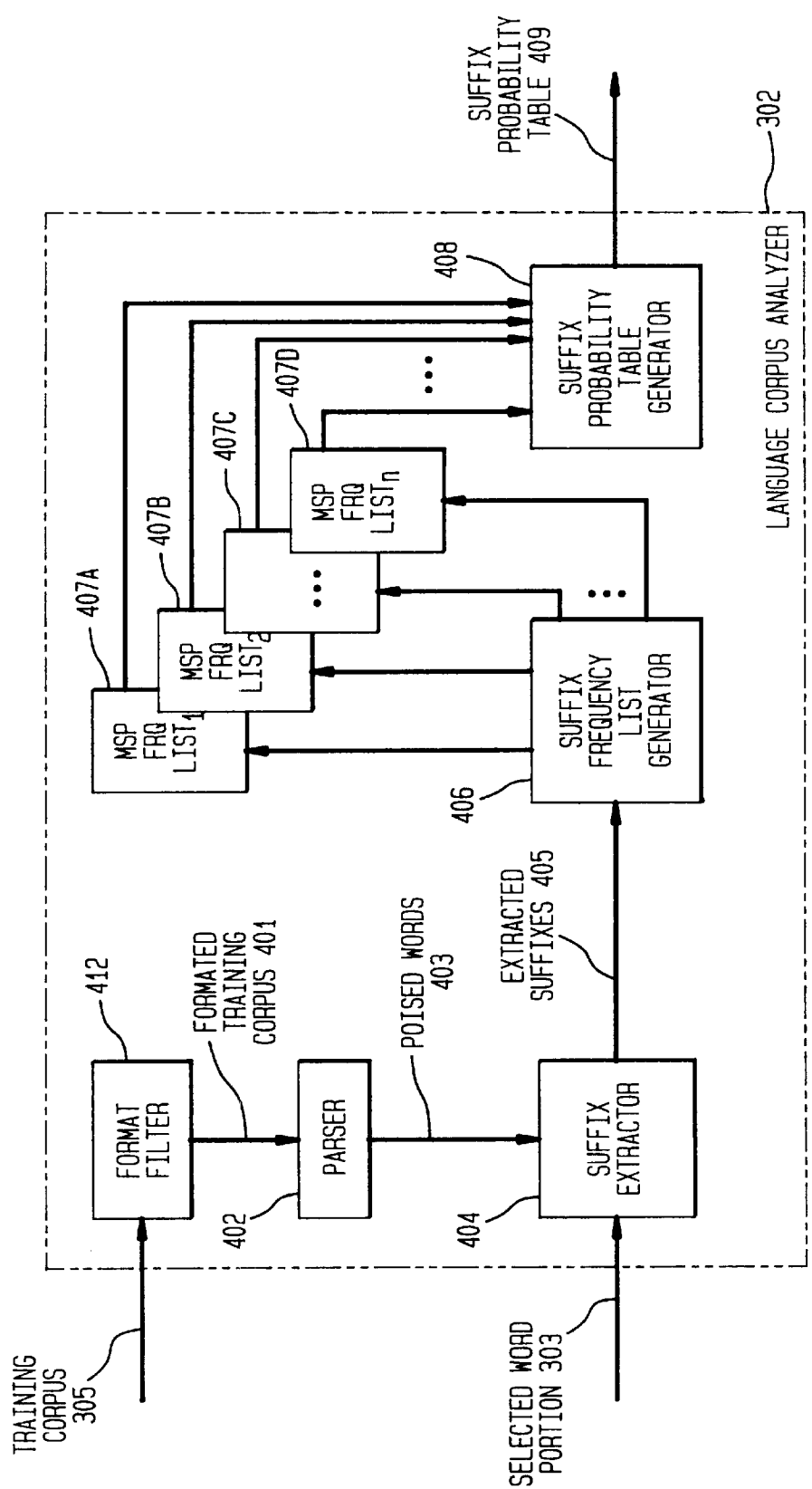
FIG. 4 is a functional block diagram of one embodiment of the language corpus analyzer of the present invention.

FIG. 4 is a functional block diagram of a preferred embodiment of the language corpus analyzer 302 of the present invention. In the illustrated embodiment, the selected word portion 303 is a predetermined number of characters at the end of the word. As noted, this portion of the word is referred to as the suffix although the actual suffix of each word may be more or less characters than the predetermined number of characters.

The training corpus 305 is preferably formatted appropriately for use by the present invention. In those environments where this is not the case, embodiments of the language corpus analyzer 302 may include a format filter 412. The format filter 412 converts each language corpus 309 into a formatted training corpus 401 as necessary. The format filter 412 removes non-relevant information from the corpuses 305. For example, the format filter 412 may remove headers and trailers, formatting information, word processing codes and tags, HTML tags, etc. In addition, the format filter 412 also converts the language corpuses 309 into ANSI text, if the corpuses 309 are in a different code set, such as ASCII, UNICODE or double byte. The ANSI character set is preferred as it includes multinational characters. It is understood, however, that the present invention may operate with other character sets.

In one embodiment, the format filter 412 searches the corpuses 309 for predetermined sequences of characters and application codes to identify and eliminate non-relevant data. In another embodiment, the format filter 412 simply discards the initial and trailing portion of the unknown text 301 to locate relevant material since most of the non-relevant information in a document is presented in the form of header and trailer material. Format filters are considered to be well known in the art, and therefore further elaboration is omitted herein. Embodiments of the present invention may implement the format filter 412, if at all, in any desired manner. Also, if the training corpus 305 does not include such non-relevant information, and if it is coded in the ANSI character set, then formatting by the format filter 412 is not necessary.

The formatted language corpuses 401 are parsed by a parser 402 which generates parsed words 403. For each language corpus 309 in the training corpus 305, the parser 402 reads characters until a word boundary is encountered. A word boundary may be anything that delimits words. In one embodiment, the parser 403 considers such items as spaces, punctuation, numerals, carriage returns and new lines as word boundaries. Other means for identifying word boundaries may also be used, depending upon the type and format of the language corpus 309.

A suffix extractor 404 extracts the suffix of each of the parsed words 403. In a preferred embodiment, the suffix is determined to be a predetermined number of characters at the end of each parsed word 403. In one preferred embodiment, the predetermined number of characters in the parsed words 403 extracted by the suffix extractor 404 is three characters. Empirical test results of a number of different languages by the inventor have shown that the most relevant suffix length for distinguishing one natural language from another appears to be three characters. Two characters are too few to distinguish one language from another and four characters do not appreciably improve the ability to distinguish languages. Accordingly, a preferred embodiment of the present invention identifies the source language of an unknown text 301 by analyzing the last three characters of the parsed words 403 and probabilistically determining which of the natural languages are best characterized by those last three characters. It should be understood that in alternative embodiments more or less characters may be used. For example, 4 characters at the end of the word may be used to capture the suffix.

The suffix extractor 404 preferably maps the suffix to a case-insensitive representation. In one embodiment, all suffixes are represented in lowercase letters. In an alternative embodiment, all uppercase letters are used. Capturing morphologically identical suffixes under the same entry (such as "The" and "the") far outweighs the disadvantage of losing the distinction between those that are morphologically unrelated (such as Dutch "ei" versus German "Ei").

When the parsed word 403 contains less than the predetermined number of characters, then the extracted suffix 405 is the word itself. Thus, in the illustrative embodiment, when the parsed word 403 contains three characters or less, then the extracted suffix 405 will be those three characters, or those two characters, or the one character.

For each language corpus 309 the suffix frequency list generator 406 receives extracted suffixes 405 from the suffix extractor 404 and generates and updates a suffix frequency list 407 corresponding to the language corpus 309. As shown in FIG. 4, there are four frequency lists 407A–407D, each corresponding to one of the language corpuses 309 shown in FIG. 3.

Each language suffix frequency list 407 includes every suffix that was extracted from the corresponding language corpus 309 along with a frequency value that is indicative of the number of times the extracted suffix 405 was found within the corresponding language corpus 309. The suffix list generator 406 populates the suffix frequency list 407 by inserting the extracted suffixes 405 into the list 407 along with an incremented frequency count. Each time a suffix 405 is encountered that was not previously encountered in the corresponding language corpus 309, the suffix list generator 406 adds a new entry to the suffix frequency list 407. Similarly, upon the re-occurrence of an extracted suffix 405 already having an entry in the frequency list 407, the generator 406 simply updates the frequency count value corresponding to the extracted suffix 405.

Once all of the extracted suffixes 405 and their associated frequency of occurrence are entered into the frequency list 407, the frequency list 407 is normalized by the generator 406. The frequency list 407 is preferably normalized to correspond to a language corpus of a predetermined length so that the frequency counts in each of the frequency lists 407 are comparable to each other. In a preferred embodiment, the suffix frequency lists 407 are normalized to correspond to a language corpus of 100,000 words. One preferred method for normalizing the suffix frequency list 407 is to divide each suffix frequency count value by the number of words in the corresponding language corpus 309 and multiply the result by 100,000.

A suffix probability table generator 408 accesses each of the frequency lists 407 to generate a suffix probability table 409. The suffix table 409 includes every suffix that occurs in at least one of the suffix frequency lists 407, along with the relative likelihood value that the input text 301 is a particular language due to the occurrence of the suffix in the input text 301. The generator 408 creates an entry for each suffix that appears in the suffix frequency lists 407. The normalized frequency values are written into the probability table 409 and associated with the language represented by the suffix list 407 being processed. This process is repeated for all suffix frequency lists 407, resulting in an intermediate table with each suffix having a single entry containing the normalized frequencies of each suffix in all of the represented languages. In other words, the suffix lists 407 are compiled into a single table.

In a preferred embodiment, suffixes that rarely occur in any of the corpuses are not entered into the probability table. In one preferred embodiment, a probability threshold is 0.0001, meaning that a suffix with a normalized frequency of less than 10 per 10,000 in every corpus will not be included in the table 409. In an alternative embodiment, other threshold values may be used. Most languages contain a large number of low frequency entries which are morphologically very uncommon, such as proper names, typographical errors, abbreviations, foreign words and words that are simply irregular. In addition, very low frequency entries tend to be random and unrepresentative. As a result, such frequency entries bias the resulting summation. In addition, the inclusion of such rare suffixes adversely affects the processing speed without providing further insight into the language of the text.

FIG. 5A illustrates an exemplary suffix probability table showing combined frequency lists for the English, French, Dutch and German languages. Each frequency list contains sample corpus frequencies for each suffix in each of the four languages. The corpus size is provided in Row 2 for each language. Since the frequency lists 502A–502D are combined in the probability table 500, there are some suffixes which do not appear in a language and are therefore given a frequency of zero (00000).

FIG. 5B illustrates the exemplary suffix probability table shown in FIG. 5A after the frequency values have been normalized to a 100,000 word corpus size.

Generator 408 converts the normalized frequency values to probabilities. It is assumed that it is equally likely that the source language of an input text 301 is any one of the represented languages. Since the frequencies are normalized to a common corpus size, they are comparable entities, each representing the number of outcomes in the probabilistic event that the input text 301 is the corresponding language. The total number of outcomes then, is the total number of occurrences of the suffix in all languages as represented by the normalized frequency values. It follows that the probability of each event is equal to the normalized frequency for the corresponding language divided by the total number of occurrences of the suffix in all languages. This yields probability values between 0.0 and 1.0 for each language associated with each suffix, with the sum of probabilities for each suffix across all languages being equal to 1.0.

As noted, in one embodiment, the probability table 304 is altered to include predetermined negative values for those word portions which do not appear in a language corpus 309, indicating a strong likelihood that the language of the input text 301 is not the corresponding language. The quantity of this valuation is such so as to allow the language identification engine 306 to quickly identify those languages which are to be disqualified from consideration while simultaneously allowing for error recovery. Such an error may be caused, for example, by a typographical error or a bit error in the unknown text. Thus, in this embodiment, the value of the relative likelihood of a particular language for a given suffix can range from a large negative value, meaning the given suffix does not likely occur in the particular language, to a small value meaning the given suffix occurs, but not very frequently in relation to other languages represented in the training corpus 304, to a value of 1.0, meaning that the suffix only occurs in the particular language.

An example may clarify. Take a suffix XXX which occurs twice in a 50 word corpus in language A, 3 times in a 400 word corpus in language B and not at all in a corpus in language C. Also, the input text may only be language A, B or C, all of which are equally likely. Normalized to a 100,000 word corpus yields a frequency of 4000, 750, and 0, respectively. The resulting probabilities indicating the relative likelihood of the outcome that the input text is the corresponding language A, B or C are, therefore, approximately 0.84, 0.16, and 0.0, respectively. The 0.0 value is subsequently replaced with a strong negative value of, for example, −0.99.

FIG. 6 is a small portion of an exemplary probability table 600. For consistency with the illustrative embodiment shown in FIG. 5, the table 600 is an example of the suffix probability table 409, referred to herein as suffix probability table 600.

The table 600 includes a listing of suffixes 602 and the probabilities that the source language of the input text 301 is each of the potential languages 604 of English, Dutch, French or German due to the occurrence of each suffix in the input text 301. For example, the probability that an input text 301 is French due to the occurrence of the suffix "de" is 0.17 while the probability that the input text in Dutch is 0.23 for the occurrence of the same suffix. Significant differences in suffixes can be seen. For example, the probability of occurrence of the suffix "et" in French is significantly higher than in English, and the probability of occurrence of "ming", while quite high in English, does not occur at all in French (at least according to the input corpus language sample corresponding to the French language). As noted, total probability for each suffix is 1.0. Thus, the suffix table 600 provides a means of characterizing languages based on morphologically-based suffix analysis, provided the input language corpus samples are a fairly accurate reflection of each of the represented languages. As noted, the relative probabilities which are zero are preferably replaced with strong negative values. Thus, the probability of the suffix "que" in English and "ing" in French are replaced with, for example, −0.99.

Figure 7:
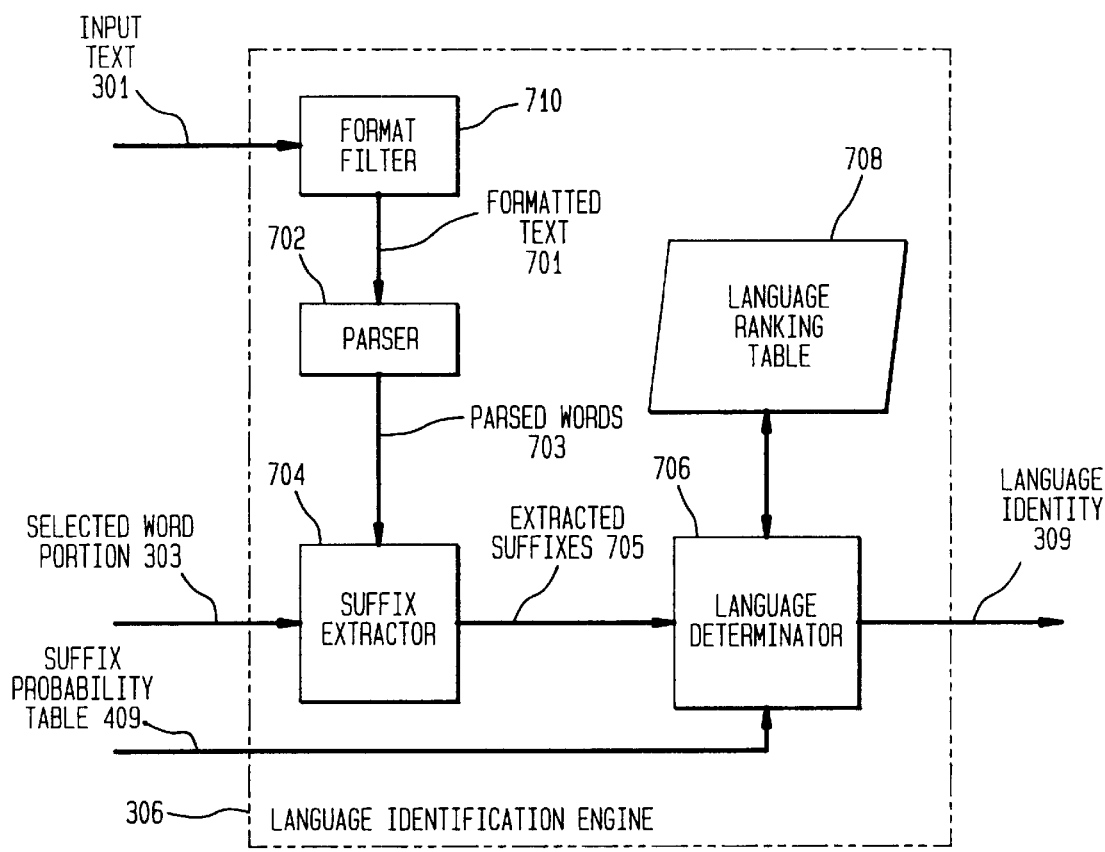
FIG. 7 is a functional block diagram of the language identification engine for performing morphological probabilistic language identification according to an embodiment of the present invention.

FIG. 7 is a functional block diagram of one embodiment of the language identification engine 306 of the present invention. As noted, the engine 306 preferably receives the unknown text input 301 as formatted text 701. Formatted text 701 is text which does not contain non-textual data, and is in ANSI. If this is not the case, embodiments of the language identification engine 306 include a format filter 710. The format filter 301 filters and formats the input text 301 in a manner similar to that described above with respect to the format filter 412.

A parser 702 parses words from the formatted input text 701 and provides parsed words 703 to a suffix extractor 704. The extractor 704 extracts the suffix of the parsed word 703 and provides the extracted suffixes to a language determinator 706. The parser 702 and the suffix extractor 704 operate in a manner similar to the parser 402 and suffix extractor 404 described above with reference to FIG. 4.

The language determinator 706 processes the suffix probability table 304, which in the illustrative example is the suffix probability table 409, using the extracted suffixes 705. The determinator 706 searches the probability table 409 for each of the extracted suffixes 705 and retrieves the associated probability values for each of the represented languages. The determinator 706 sums the relative probabilities associated with all of the extracted suffixes 705 for each language to arrive at a total "probability" value representing the relative likelihood that the input text 301 is a particular language as compared to the other languages represented in the training corpus 305. Since the accumulated value is the sum of many values between 0.0 and 1.0, the total is often greater than 1.0 and, therefore, is not a "probability" but rather a sum of probabilities representing a relative likelihood. In a preferred embodiment, the language determinator 706 creates and maintains a language ranking table 708 containing these accumulated probability values for each language for which there is a language corpus 309.

Once the input text 301 is completely processed, the language determinator 706 determines the language of the input text 301 based upon the total accumulated probability values. Whether identification is possible is dependent upon these values and the number of extracted suffixes. If all of the total accumulated probability values are less than zero or if an insufficient number of suffixes have been extracted to characterize the unknown text 301, then the language determinator 706 generates an error condition indicating that the language of the unknown text input 301 is not determinable. Otherwise, the determinator 706 identifies the language of the input text 301 as that language having the greatest relative likelihood: that is, the greatest total accumulated probability value.

Figure 8:
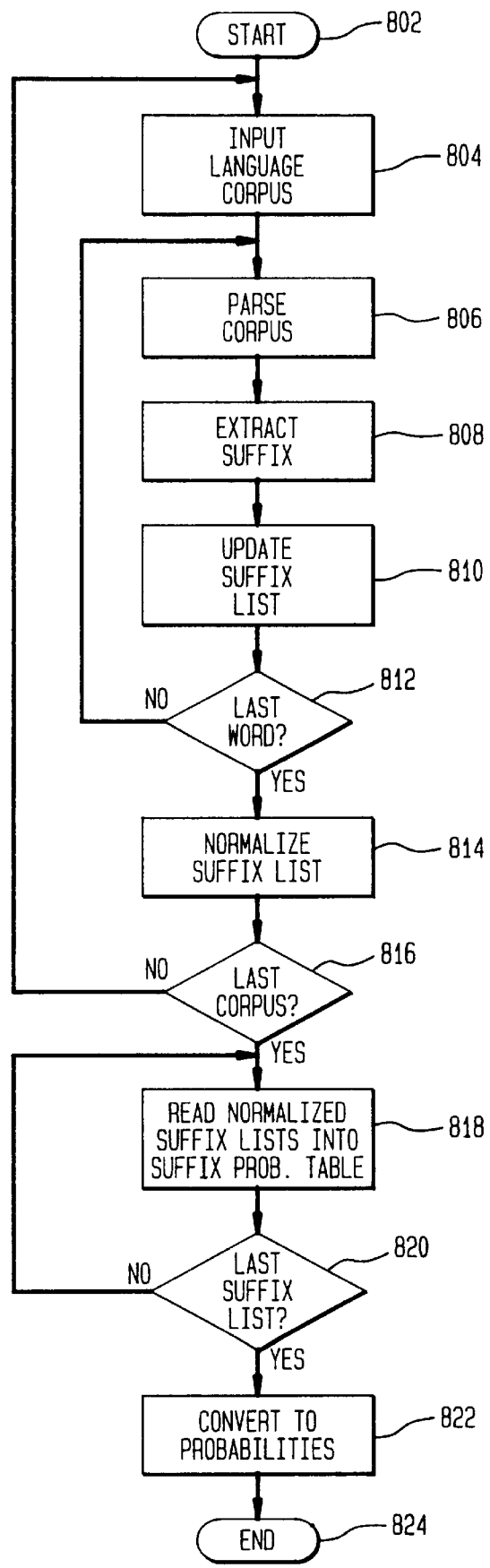
FIG. 8 is a flowchart of the functions performed by the present invention to create the exemplary suffix probability table in accordance with one embodiment of the present invention.

The operation of the automatic language identification system 110 of the present invention is described in further detail below with reference to the flowcharts shown in FIGS. 8 and 9. FIG. 8 is a flowchart of one embodiment of the morphologically-based functions performed by the language corpus analyzer 302 to create the morphological probability values while FIG. 9 is a flowchart of the functions performed by the language identification engine 306 to identify the language of an input text using the probability values generated as depicted in FIG. 8. FIGS. 8 and 9 will be described in the context of the illustrative suffix-based example introduced above.

Referring to FIG. 8, after start block 802, a language corpus 309 is received by the language corpus analyzer 302. The language corpus 309 is filtered and formatted at block 804 if necessary. At block 806, a word is parsed from the language corpus 309. The desired word ending of the parsed word is extracted at block 808. In one embodiment, the last three characters of the parsed word are extracted. As noted, the last three characters of a word have been empirically determined to be the most relevant suffix length with which to characterize a language due to its morphological content.

At block 810, a suffix probability list 407 corresponding to the input language corpus 309 is updated with the frequency of the extracted suffix. This process of parsing words from the input text and extracting the suffix of the parsed words is repeated for all words in the language corpus 309 as shown by decision block 812. The resulting language suffix probability list 407 includes every suffix that was extracted from the language corpus 309 along with a frequency value that is indicative of the number of times the extracted suffix was found within that language corpus 309.

Once all of the extracted suffixes 405 and their associated frequency of occurrence in a language corpus 309 are entered into the corresponding frequency list 407, the frequency list 407 is normalized at block 814 to place each input language on a comparative basis regardless of the size of the learning corpus. As noted, in a preferred embodiment, the suffix frequency lists 407 are normalized to correspond to a corpus of 100,000 words.

After the suffix list 407 has been normalized, a determination is made at block 816 as to whether other input language corpuses 309 remain to be analyzed. If so, processing returns to block 804 whereat the next input language corpus in the training corpus 305 is processed. Alternatively, processing continues at block 818 whereat the normalized suffix frequency lists 407 are read into the suffix probability table 409. Here, one entry is created for every suffix that appears in the frequency lists 407. The entry includes the suffix along with the normalized frequency values of the suffix in each language. Each time a suffix is encountered in a normalized suffix list, a new entry is added to the suffix table, along with the suffix's normalized frequency. If a suffix does not occur in a particular language corpus, then the frequency is set to zero. As noted, in a preferred embodiment, suffixes that rarely occur in any of the corpuses are not entered into the probability table.

The above process is repeated for all suffix lists 407 as shown by decision block 820. When it is determined that the last normalized suffix frequency list 407 has been read and the suffix probability table 409 updated accordingly, processing proceeds to block 822 whereat the normalized frequency values in the suffix probability table 409 are converted into probabilities representing the relative likelihood that the language of an input text is one of the languages in the training corpus 305 due to the presence of the suffix. The suffix probability table 409 is now available for use by the language identification engine 306. The process terminates at block 824.

Figure 9A:
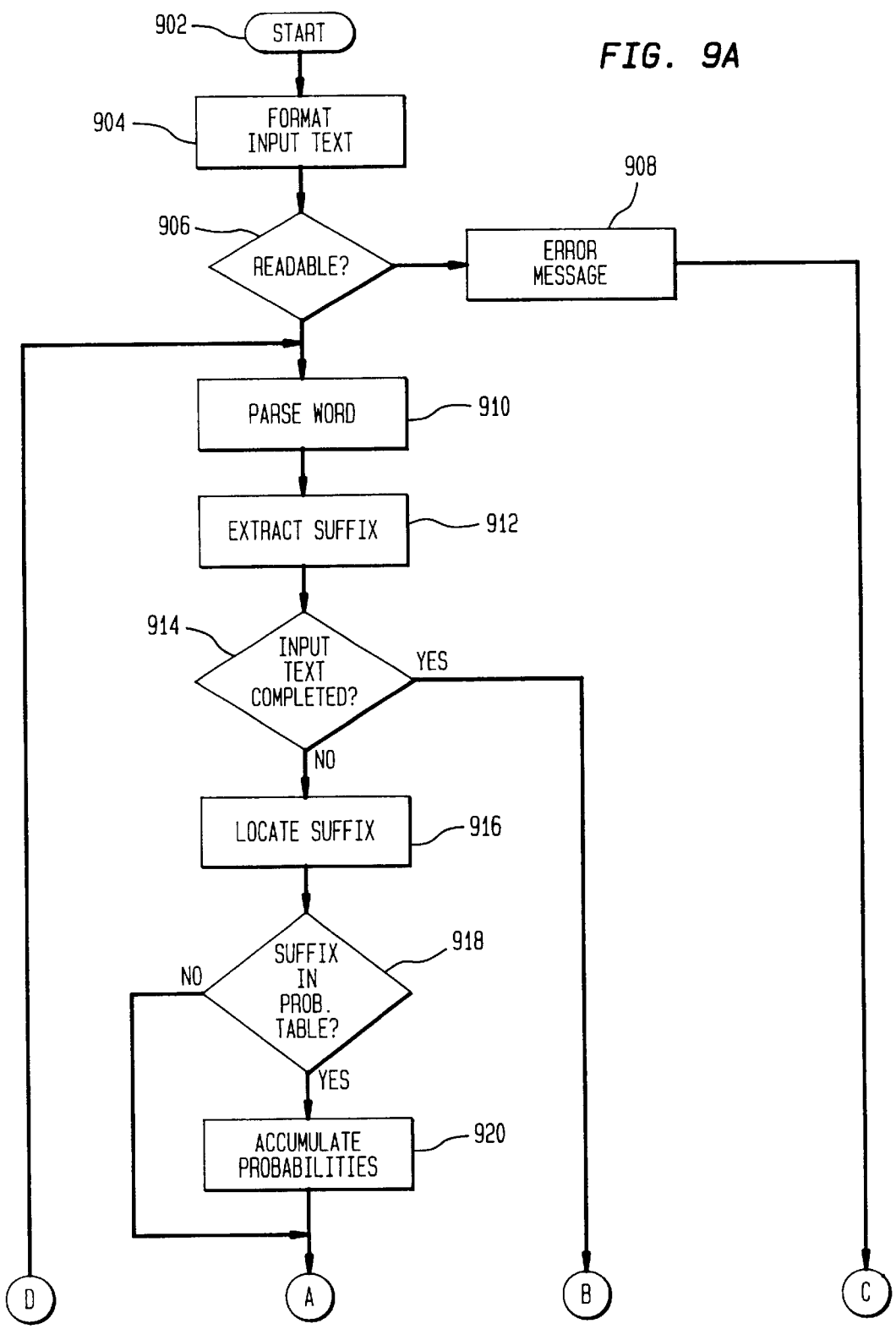

FIGS. 9A and 9B are a flowchart illustrating one embodiment of a language identification process performed by the language identification engine 306 of the present invention. At start block 902 the language identification system 110 is invoked in any known manner. For example, the methodology of the present invention may be invoked by any general purpose application program such as a word processor or Internet search engine, or by a user through, for example, a graphical user interface. As noted, suffix extraction preferably includes mapping the suffix to a case-insensitive representation to capture morphologically identical suffixes under the same entry.

At block 904 the optional process of formatting and filtering the input text 301 is performed. As noted, the input text may need to be filtered by removing non-relevant information and formatted by converting the code mapping to ANSI. These processes are optional as noted above. Since the input text may come from any number of sources, such as a stored file, an application program, Internet search query reply, E-mail, etc., a determination is made at block 906 as to whether the input text is readable. For example, the input text may be incapable of being properly filtered and/or formatted, because the format filter does not recognize the format, or the character set mapping of the input file. Alternatively, the input file may be something other than text, like a TIFF file, or GIF file. When it is determined that the sample of text is unreadable, a message is generated at block 908 indicating such and the process ceases at block 936. In contrast, when it is determined that the sample of text can be formatted and/or converted as necessary, the properly-formatted input text is parsed at block 910 and a suffix is extracted from the parsed word at block 912. As noted, suffix extraction preferably includes mapping the suffix to a case-insensitive representation to capture morphologically identical suffixes under the same entry.

At block 914 a determination is made as to whether the input text 301 has been completely processed. This may be determined, for example, when the extracted suffix includes an end-of-file marker. When it is determined there are additional words in the text, processing proceeds to block 916, whereat the probability suffix table 409 is searched for the extracted suffix. When the extracted suffix corresponds to an entry located in the suffix probability table 409, each of the associated probabilities for each of the languages are retrieved and the probabilities for each language are accumulated at block 920. As noted, the accumulated probability values are preferably maintained in a language ranking table 708. If the suffix cannot be located in the table 409, as determined at block 918, then block 920 is not performed and processing continues at block 922. In other words, the suffix is simply ignored.

At block 922, it is determined as to whether a sufficient number of words have been parsed from the input text 301 to identify the source language. In one embodiment, this is accomplished by comparing the number of parsed words to a predetermined maximum sample value. The maximum sample value will vary based upon a number of factors. In a preferred embodiment, the factors include the number of different languages represented in the training corpus 305, the quality of formatted text, the variety of documents used to form the language corpus 309 and, subsequently, the suffix probably table 409, and the similarities of the represented languages.

The similarity of one language to another may vary, or be based upon different characteristics according to the morphological-based approach. Here, with suffixes, certain, albeit different languages, such as romance languages can be quite similar to one another. If a different morphologically-based approach is used, for example, using prefixes, then other languages may be similar to one another. Significantly, in one exemplary application of 15 represented languages (English, French, German, Spanish, Italian, Dutch, Swedish, Danish, Norwegian, Portuguese, Finnish, Indonesian, Turkish, Russian, Greek), this maximum sample value can be as low as 20 words and still reliably identify the language of the input. The maximum sample value may be set empirically, and represents that point where further analysis of the input text is unlikely to improve identification results. When it is determined at block 922 that an insufficient number of words have been parsed, the analysis routine returns to block 910, whereat the next word is parsed from the input text 301. Other factors may also be considered.

When it is determined, at block 914, that the end of the input text 301 has been reached, processing proceeds to block 924 whereat a determination is made as to whether so few words have been parsed from the text 301 as to render any attempt at language identification valueless. This is accomplished by comparing the number of parsed words to a predetermined minimum sample value. The minimum sample value will, like the maximum sample value used at block 922, vary based upon a number of factors, which may include those mentioned above. Significantly, in an exemplary application of 11 represented languages, this minimum sample value can be as low as 3 words and still reliably identify the language of the unknown input text. If the minimum number of words have not been parsed, an error message indicting such is generated at block 926.

When it is determined that a sufficient number of words have been parsed, either at blocks 922 or 924, processing continues at block 928 whereat the language having the highest accumulated probability value is determined. At block 930 a determination is made as to whether this value is greater than zero. If not, then a message indicating that the source language of the input text could not be accurately identified is generated at block 932. This may occur when none or very few of the extracted suffixes characterize any of the languages represented in the training corpus 305.

Alternatively, when the highest accumulated probability value is greater than zero, a message is generated at block 934 identifying the source language of the input text 301. In the case where two or more languages have the same accumulated probability value (a rare event based on empirical testing), then any form of tie-breaking may be used. In one embodiment, tie breaking is performed in the order of English, then French, then German, then Spanish, etc, but other approaches may be used. After any of steps 908, 926, 932 and 934 the process terminates at block 936.

The flowcharts show in FIGS. 8 and 9 represent but one possible method of creating suffix frequency lists 407 and generating a suffix probability table 409. Numerous other methods will be readily apparent to one of ordinary skill in the art. Moreover, as one skilled in the relevant art would find apparent, the order of many of the steps depicted in FIGS. 8 and 9 may be rearranged without adverse consequence.

Figure 10:
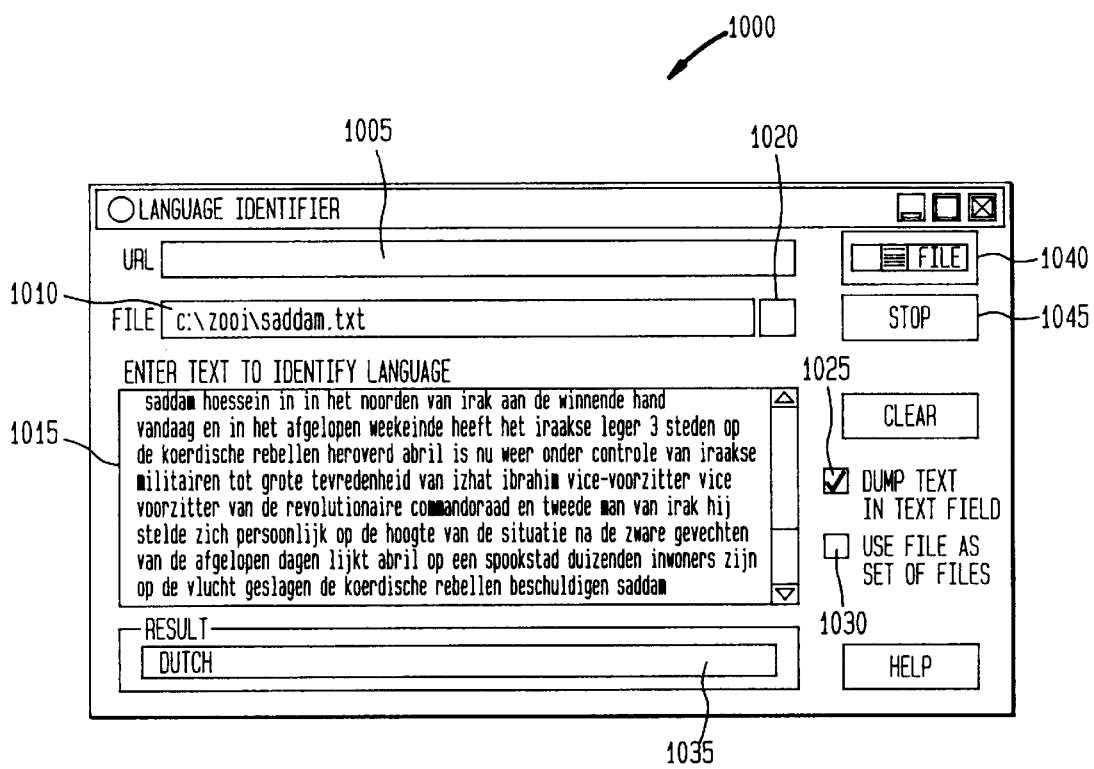
FIG. 10 illustrates a view of a graphical user interface window which may be used to enable a user to perform morphological probabilistic language identification of an unknown text in accordance with the present invention.

FIG. 10 illustrates a graphical user interface (GUI) utilized in one embodiment of the present invention. The GUI 1000 enables a user to invoke the automatic language identification system 110 and provides a formatted text sample to the language identification engine 306, and displays the language identity output 309.

As shown in FIG. 10, the display window of the GUI includes a number of input areas 1005, 1010, 1015 in which to identify the source of the input text 301. For example, input area 1005 allows a user to enter a URL to be identified, input area 1010 allows the user to enter a file to be identified, and input area 1015 allows the user to directly enter text for identification. Input area 1010 includes a browse button 1020 to browse through a list of files, and input area 1015 can also be selectively configured via box 1025 to receive the unknown text sample based on either a URL or a file specification. Box 1030 permits the user to specify a set of files to be identified, and output area 1035 displays the identified language of the input of text or other messages such as those generated at blocks 908, 926 and 932. Boxes 1040 and 1045 are respectively used to start and stop language identification. Box 1040 toggles based upon the mode of user input, for example, from file mode, to URL mode, to Text mode. In alternative embodiments the GUI also displays a national flag corresponding to the identified language when the language of the input sample is identified.

Embodiments of the present invention exhibit a number of advantages over conventional language identification systems. Because natural languages are characterized by their morphological characteristics, the amount of sampling and computation that needs to be performed on an unknown input sample of text is minimal relative to conventional methods for identifying a source language. For example, whereas trigram-based identification requires approximately seven samples and seven comparisons for each word of an unknown text (based on an average character length of seven characters per word), the preferred morphological suffix identification requires only one sampling and one comparison per word. Accordingly, based on an average word length of seven characters, the suffix analysis of the present invention can be expected to be seven times faster than trigram based methods. Moreover, morphologically-based identification can identify the language of an unknown text using fewer words than methods that are based on analyzing the most frequently used words of a given language. Although frequently used words have a high incidence in most large written samples of text, they typically do not have a high incidence in smaller samples of text. For example, the phrase "language identification using morphologically-motivated probabilistic analysis" contains few, if any, frequently used function words, but contains a wealth of morphologically-significant information. Natural language queries and document titles are examples of small input text having few frequently-used words. However, even a relatively short title of a research abstract can contain sufficient morphological information for the present invention to readily identify the language in which it is written. In contrast, the absence of typically ubiquitous function words will render the most frequently used word analysis difficult at best.

Other advantages of the present invention may be attributed to how embodiments of the invention utilize morphologically-based analysis to identify the language of an unknown text. As previously mentioned, values of the frequency counts for each suffix in a suffix frequency list 407 are normalized so that each of the languages are equally considered. In addition, each of the probability values in the suffix probability table 409 are normalized across each language so that the probability table represents the frequency of occurrence of a given suffix in each of the represented languages in the suffix table, across all of the represented languages. It is important to note that when the normalized probability value for a given suffix in a particular language is zero, this conveys a great deal of information that conventional systems do not take into account. That is, a zero normalized probability means that the given suffix does not likely occur at all in the particular language. Conventional language identification systems only identify languages by what is common or frequent in a language. However, embodiments of the present invention, in addition to being morphologically based, also identify languages based on what is very infrequent; that is, suffixes which are not morphologically possible in a given language. As noted, to incorporate this additional information, embodiments of the present invention utilize a highly negative "probability" value when the extracted suffix does not occur at all in that language. Accordingly, the values in the total probability table very quickly identify which languages are characterized by the extracted suffix, as well as which languages are not characterized by the extracted suffix. As a result, only a minimal number of words need to be sampled from the input text to identify its source language.

Based on results obtained with a variety of input samples of text, the morphological suffix analysis of the present invention can identify the source language of the input text more quickly than either trigram-based analysis or the most frequently used word analysis methods. In particular, the present invention excels on small input texts where there is not enough input text to exceed hit thresholds used in trigram-based methods, nor enough frequently used words in the input text to be utilized by the most frequent word methods. Accordingly, the techniques of the present invention can be used by a wide variety of application programs without incurring heavy computational resources or time.

An additional benefit of the methodology used by the present invention over trigram-based methods is that it is less likely to mis-identify an unknown language. For example, given a large input text, a trigram-based method may eventually identify enough trigrams to generate a mis-identification. However, because of the use of highly negative values, the language ranking table 708 will contain values that migrate towards negative values with each word of the input text. In the event that none or very few of the suffixes extracted from the input sample exist in any of the represented languages, then the estimated probability for each of the languages in the total probability table will be zero and no mis-identification occurs.

As noted, the techniques of the present invention are equally applicable to right-to-left alphabetic languages as they are to left-to-right alphabetic languages. For example, for languages such as Arabic and Hebrew, rather than extracting a suffix as a predetermined number of characters located on the right-hand side of a word, the suffix may instead be extracted as a predetermined number of characters located on the left hand side of the word. For example, the selected morphological portion 303 of the word may include specifications as to which portion of a word to consider, how many characters to consider, and the language direction. Other alternatives will readily occur to one of ordinary skill in the art.

Having thus described at least one illustrative embodiment of the invention, various alterations, modifications, and improvements will readily occur to those skilled in the art. Such alterations, modifications, and improvements are intended to be within the spirit and scope of the invention. For example, rather than extracting the last one or two or three characters of a word as a suffix, one could instead extract only the last three characters of words that are greater than a certain length (perhaps 5 characters or more) to further ensure that the suffix extracted is morphologically significant. Or alternatively, both prefixes and suffixes could be extracted. Accordingly, the foregoing description is by way of example only and is not intended as limiting. The invention is limited only as defined in the following claims and the equivalents thereto.

What is claimed is:

1. A method for determining in which language of a plurality of represented languages an input text is written comprising the steps of:

comparing probability values, each said probability value being associated with one of said languages and being a normalized ratio of a frequency at which a suffix occurs in a language corpus written in said associated represented language;

determining, based on said probability values, a relative likelihood that the input text is written in a particular one of said plurality of represented languages due to the presence of said suffix.

2. The method of claim 1, wherein said suffix is a three character word ending.

3. An automatic language identification system for determining a source language of a text, comprising:

a language corpus analyzer that generates, for each of a plurality of fixed-length suffixes extracted from at least one of a plurality of language corpuses each representing a natural language, a plurality of probabilities each associated with one suffix and one of said plurality of natural languages, each of said probabilities representing a relative likelihood that said associated source language is one of the natural languages based on a frequency with which said suffix occurs in the associated language corpus, and a language identification engine that determines, for each of said represented languages, an arithmetic sum of relative probabilities for each of a plurality of suffixes which appear in the text, wherein said relative frequency is normalized to correspond to a reference language corpus having a word count that is greater than that of said plurality of language corpuses, and wherein each said probability is equal to said normalized frequency for said corresponding language corpus divided by a total number of occurrences of said suffix in all language corpuses, and wherein said source language is identified as being one of said plurality of said represented languages having a greatest arithmetic sum of said relative probabilities.

4. The system of claim 3, wherein said language corpus analyzer further comprises:
a parser for parsing said language corpuses to generate parsed words; and
a morpheme extractor for extracting said fixed-length suffixes from each of said parsed words.

5. The system of claim 4, wherein said language corpus analyzer further comprises:
a format filter for formatting said language corpuses for said language corpus analyzer.

6. The system of claim 3, wherein said language identification engine comprises:
a language determinator for accumulating said relative likelihood values associated with one of said languages which are associated with said suffixes which appear in the text.

7. The system of claim 3, wherein said probabilities are set to a negative value when said associated suffix does not appear in said one or more language corpuses corresponding to said associated language,
wherein said arithmetic sum of said relative probabilities exceeds zero for said represented language to be determined to be said source language.

8. The system of claim 3, wherein said suffix is a last three characters at a right side of a word when said language is a left-to-right language and a first three characters on a left side of a word when said language is a right-to-left language.

9. The system of claim 3, wherein each of said plurality of language corpuses is derived from a plurality of documents in each of a variety of sources.

10. The system of claim 3, wherein said language identification engine is software and further wherein said probability table is a finite state automaton compiled with said language identification engine.

11. The system of claim 3, wherein said frequency list is normalized to correspond to a language corpus of 100,000 words.

12. An automatic language identification system for determining a source language of a text, said source language being one or a plurality of represented languages, the system comprising:
first means for determining, for each of said plurality of represented languages, an arithmetic sum of relative probabilities for each of a plurality of word endings which appear in the text, the system indicating said source language being in one of said plurality of represented languages that has associated therewith a greatest arithmetic sum of said relative probabilities including, second means for generating a normalized frequency list for each of a plurality of language corpuses each of which is associated with one of said represented languages, each said normalized frequency list including a normalized value indicating a number of appearances of an extracted word ending in a corresponding one of said plurality of said language corpuses; and third means for generating a probability table containing said plurality of probabilities using said normalized frequency values in said normalized frequency lists.

13. The system of claim 12, wherein said language indentification engine comprises:
language determinator means for accumulating said relative likelihood values associated with one of said languages which are associated with said word endings which appear in the text.

14. The system of claim 12, wherein said probabilities are set to zero when said associated word ending does not appear in said language corpus corresponding to said associated language.

15. A method for identifying the language of a text, the language being one of a plurality of languages represented by a language corpus, the method comprising the steps of:
a) parsing a word from the language corpus;
b) extracting all suffixes from said parsed words, said suffixes being a last three characters of a word;
c) updating a suffix frequency list corresponding to the language corpus with said extracted suffix and a normalized frequency of occurrence of said extracted suffix in said corresponding language corpus;
d) repeating said steps (a) through (c) for each of the plurality of language corpuses to result in a plurality of frequency lists, each associated with one language corpus; and
e) creating a probability table containing probabilities derived from said normalized frequency of occurrence and representing a relative likelihood that the language of the text is one of the represented languages due to the presence of said suffix.

16. The method of claim 15, further comprising the step of:
f) substituting a negative value in said table for all probability having a value of zero.

17. The method of claim 16, further comprising the steps of:
g) parsing the text to generate a sample word;
h) extracting a sample suffix from said sample word;
l) retrieving, for each said extracted sample suffix in said probability table, said associated probabilities;
j) summing, for each of said represented languages, said associated probabilities retrieved from said probability table, resulting in an accumulated relative likelihood value that language of the text is said corresponding language due to the appearance of said sampled suffix in said text;
k) repeating said steps g) through j) for a predetermined number of sampled words; and
l) selecting one of said represented languages as the language of the text, said selected language having a highest accumulated probability value greater than zero.

18. The method of claim 15, further comprising the step of:
  f) before said step a), creating said language corpus from a number of written texts to characterize a particular language according to one or more selected morphological characteristics.

19. A program storage device readable by a machine, tangibly embodying a program of instructions executable by the machine to perform method steps for identifying the language of a text, the language being one of a plurality of languages represented by a language corpus, said method steps comprising:
  a) parsing a word from the language corpus;
  b) extracting all suffixes from said parsed words, said suffixes being a last three characters of a word;
  c) updating a suffix frequency list corresponding to the language corpus with said extracted suffix and a normalized frequency of occurrence of said extracted suffix in said corresponding language corpus;
  d) repeating said steps (a) through (c) for each of the plurality of language corpuses to result in a plurality of frequency lists, each associated with one language corpus; and
  e) creating a probability table containing probabilities derived from said normalized frequency of occurrence and representing a relative likelihood that the language of the text is one of the represented languages due to the presence of said suffix.

* * * * *